(12) United States Patent
Falcone

(10) Patent No.: US 7,782,976 B1
(45) Date of Patent: Aug. 24, 2010

(54) MULTIPLE CHANNEL WAVEFORM GENERATOR WITH DYNAMIC DELAY THROUGH SYMBOL SUPERRESOLUTION

(75) Inventor: Kenneth Arthur Falcone, Bedford, MA (US)

(73) Assignee: Bedford Signals Corporation, Bedford, MA (US)

( * ) Notice: Subject to any disclaimer, the term of this patent is extended or adjusted under 35 U.S.C. 154(b) by 557 days.

(21) Appl. No.: 11/974,205

(22) Filed: Oct. 12, 2007

(51) Int. Cl.
*H04L 27/00* (2006.01)
(52) U.S. Cl. .......................................... 375/295; 342/21
(58) Field of Classification Search ................ 375/295, 375/296, 299; 342/21, 58
See application file for complete search history.

(56) References Cited

U.S. PATENT DOCUMENTS

| | | | |
|---|---|---|---|
| 3,997,772 A | 12/1976 | Crochiere et al. | |
| 4,168,502 A | 9/1979 | Susie | |
| 4,250,634 A | 2/1981 | Buckler | |
| 4,438,502 A | 3/1984 | Fox et al. | |
| 4,450,447 A | 5/1984 | Zebker et al. | |
| 4,536,853 A | 8/1985 | Kawamoto et al. | |
| 4,626,217 A | 12/1986 | Tardif et al. | |
| 4,833,602 A | 5/1989 | Levy et al. | |
| 4,986,755 A | 1/1991 | Johnson | |
| 5,379,322 A | 1/1995 | Kosaka et al. | |
| 6,278,731 B1 | 8/2001 | Galperin | |
| 6,384,771 B1 | 5/2002 | Montague et al. | |
| 6,549,051 B1 | 4/2003 | Di Veroli et al. | |
| 7,394,869 B2 * | 7/2008 | Jensen et al. | 375/302 |

* cited by examiner

*Primary Examiner*—Shuwang Liu
*Assistant Examiner*—David Huang

(57) ABSTRACT

A waveform generator for simulating multiple, differently delayed signals. Dynamic signal delays include modulation delay and carrier phase shift, as well as modulation and carrier Doppler shift, acceleration, and jerk. Modulation delays are accurately interpolated in symbol time through symbol shape superresolution. This decouples the symbol rate from the sample rate and allows the generation of multiple source waveforms per digital to analog converter. Symbol shape prefiltering can remove the aliasing introduced by superresolution.

20 Claims, 5 Drawing Sheets

MULTIPLE CHANNEL WAVEFORM GENERATOR WITH DYNAMIC DELAY THROUGH SYMBOL SUPERRESOLUTION

FEDERALLY SPONSORED RESEARCH

This invention was made in part with U.S. Government support under a Small Business Innovative Research (SBIR) Air Force contract. The Government under the SBIR Program has certain rights in the invention.

CROSS-REFERENCE TO RELATED APPLICATIONS

Not Applicable

SEQUENCE LISTING OR PROGRAM

Not Applicable

BACKGROUND OF THE INVENTION

1. Field of Invention

This invention relates to waveform generators, specifically to a waveform generator with multiple outputs having arbitrary delays that change over time.

2. Prior Art

Waveform generators are used to create signals that provide a stimulus for devices under test. The generators can be programmed to produce signals with a specified amount of noise, interference, frequency offset, frequency drift, protocol errors, and other factors. Testing with these waveforms can verify whether a device has satisfactory performance under adverse conditions. These tests can be performed using hardware test equipment or software simulations of the waveform and device under test.

The waveform is typically sampled or generated on a computer, and then saved in digital memory. At runtime, the memory is sequentially accessed to realize the waveform. The digital waveform samples can be used in software, or can drive a digital to analog converter (DAC) that outputs the waveform electrically, as in U.S. Pat. No. 4,438,502 to Fox et al. (1984). This basic technique is best at implementing a waveform that is closely synchronized with the frequency and phase of the DAC clock, and repeats over a period of time less than or equal to the number of samples that can be saved in memory. When implementing multiple signals, it may be necessary to break the tight clock-signal relationship because the signals aren't closely related to each other. To retain signal quality, this will typically involve interpolating the waveform for fractional waveform sample delays, as in U.S. Pat. No. 4,536,853 to Kawamoto et al. (1985).

Modern communication systems transmit and receive multiple signals simultaneously, using multiple antennas. They also operate in an environment where there are many potential interference signals. Specific systems of interest include anti-jamming, direction finding, multiple user detection, geolocation, and emitter identification for RADAR, Global Positioning System (GPS), cellular, Wi-Fi, Bluetooth, and many other radio applications.

Testing modern communication systems requires the generation of multiple versions of a waveform, one for each antenna at the receiver. Each waveform can consist of signals from multiple sources, and the delay between the transmitter antenna and the receiver antenna is different for each antenna. Relative movement of the transmitter and receiver change the signal delay, Doppler shift, acceleration, and jerk over time. This can cause receiver modulation and carrier tracking loops to lose lock. Also, specific delays are necessary for the proper operation of geolocation equipment such as GPS receivers, and relative delays are required for phased arrays to identify specific signals and their direction of arrival.

The need for dynamic delay simulation is greatest in sonar and radar applications, and much work has been focused on these areas. Sonar applications have no radio frequency carrier, so these solutions don't properly handle Doppler for communications systems, as evident in U.S. Pat. No. 4,250,634 to Buckler (1981), U.S. Pat. No. 4,626,217 to Tardif et al. (1986), and U.S. Pat. No. 4,986,755 to Johnson (1991). Even in radar, the relationship between modulation and carrier Doppler and is not critical, so the carrier phase is not controlled. Prior efforts in U.S. Pat. No. 4,168,502 to Susie (1979), U.S. Pat. No. 4,450,447 to Zebker et al. (1984), and U.S. Pat. No. 6,384,771 B1 to Montague et al. (2002) show that the Doppler is treated only as a frequency shift, not a phase shift over time. The best delay techniques use an interpolation function, as in U.S. Pat. No. 3,997,772 to Crochiere et al. (1976) and U.S. Pat. No. 6,549,051 to Di Veroli et al. (2003), that requires significant resources and adds its own distortion. Sonar and radar target simulators are based on the reflection of an unknown signal from a transmitter. These methods aren't efficient or easily applicable in testing communication systems.

In communications, sonar, and radar applications that require a high signal to noise ratio and a wide bandwidth, basic techniques can't be supported by the current technologies. What is needed is an efficient waveform generator that supports dynamic channel delay and the generation of multiple waveforms. This can be accomplished by using information about the simulated signal that is known prior to generation.

Objects and Advantages

Accordingly, several objects and advantages of the invention are:

(a) to provide a wide or narrow band waveform for use in generating a signal for testing or implementing modern sonar, radar, geolocation, and communication systems;

(b) to provide waveform generation such that a real time controller only needs to provide the signal modulation coefficients, reducing the controller speed requirements;

(c) to provide a high precision, low distortion, delayed version of the signal having minimal aliasing for high performance systems;

(d) to provide multiple, differently delayed versions of the signal to model propagation through channels to multiple receive antennas;

(e) to provide accurate control over the relative delays of the multiple signal versions for testing systems that simultaneously use information from multiple receive antennas;

(f) to provide relative delays that don't accumulate precision errors over time;

(g) to provide a signal with delay updates in real time for use with hardware in the loop (HWIL) testing;

(h) to provide multiple signal sources per DAC, so a multiple source waveform generator is small, efficient, and affordable;

Further objects and advantages will become apparent from a consideration of the ensuing description and drawings.

SUMMARY

In accordance with the present invention, a waveform generator combines a modulation interpolator based on symbol superresolution with the correct phase shift for the frequency of an external local oscillator to simulate multiple, differently delayed signals. Dynamic signal delay is accurately modeled in terms of phase, Doppler shift, acceleration, and jerk. Symbol shape prefiltering removes the aliasing introduced by superresolution.

DRAWINGS

Figures

DRAWINGS

Figure 1:
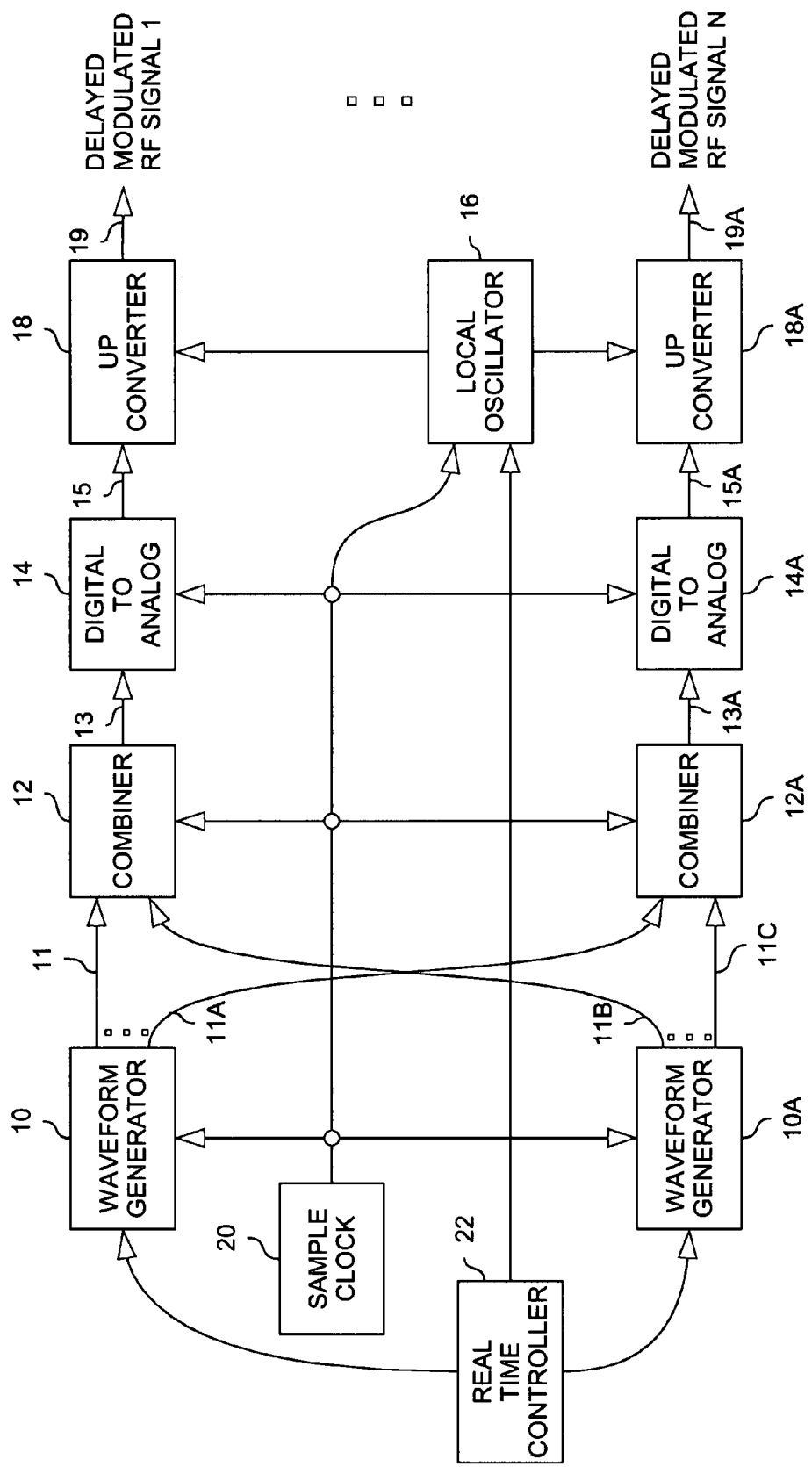
FIG. 1 is a block diagram showing a multiple source radio frequency (RF) signal generator application of the multiple channel waveform generator.

Reference Numerals 10, 10A multiple channel waveform generator
11, 11A, 11B, 11C delayed and phase shifted modulation
12, 12A modulation combiner
13, 13A combined modulation
14, 14A digital to analog converter (DAC)
15, 15A analog delayed modulation
16 local oscillator
18, 18A up converter
19, 19A delayed modulated radio frequency (RF) signal
20 sample clock
22 real time controller
24 system time generator
25 system time in clock cycles
26 signal delay generator
27 signal delay in clock cycles
28 signal time combiner
29 signal time in clock cycles
30 clock to symbol translator
31 signal time in symbol periods
32 symbol coefficient look up table
33 current symbol coefficient
34 modulation interpolator
35 interpolated modulation
36 clock to radio frequency (RF) carrier translator
37 signal delay in radio frequency (RF) carrier cycles
38 clock to intermediate frequency (IF) carrier translator
39 signal time in intermediate frequency (IF) carrier cycles
40 carrier phase combiner
41 carrier phase
42 carrier amplitude look up table
43 current carrier amplitude
44 multiplier
46 single channel waveform generator
48 system frequency register
50 system time accumulator
52 signal delay third derivative (relative jerk) register
54 signal delay second derivative (relative acceleration) accumulator
56 signal delay first derivative (relative velocity) accumulator
58 signal delay accumulator
61 integer part of the signal time in symbols
63 fractional part of the signal time in symbols
64 signal time delay register
65 delayed signal time
66 comparator
67 clock enable
68A, 68B, 68C symbol coefficient delay register
69A symbol coefficient before last
69B last symbol coefficient
69C next symbol coefficient
70A symbol before last shape look up table
70B last symbol shape look up table
70C next symbol shape look up table
70D symbol after next shape look up table
71A symbol before last current shape
71B last symbol current shape
71C next symbol current shape
71D symbol after next current shape
72A, 72B, 72C, 72D multiplier
73A current value of symbol before last
73B current value of last symbol
73C current value of next symbol
73D current value of symbol after next
74 symbol combiner
77 rectangular symbol shape
79 rectangle interpolated modulation
81 filtered rectangular symbol shape
83 filtered rectangle interpolated modulation
85 spectrum of the rectangular symbol shape
87 spectrum of the filtered rectangular symbol shape

DETAILED DESCRIPTION

FIGS. 1, 2, 3, 4—Preferred Embodiment

FIG. 1 shows a signal generator application, where a plurality of waveform generators 10, 10A emulate multiple transmitted signals. Each waveform generator 10, 10A has a plurality of delayed and phase shifted modulation 11, 11A, 11B, 11C outputs having different dynamic delays. The modulation outputs 11, 11A, 11B, 11C of the generators 10, 10A are connected to modulation combiners 12, 12A, and the output goes to a digital to analog converter (DAC) 14, 14A that outputs an analog delayed modulation signal 15, 15A. The analog signal may be combined with a local oscillator 16 signal in an up converter 18, 18A, generating a delayed modulated radio frequency (RF) signal 19, 19A with a higher carrier frequency. The digital 11, 11A and analog 15, 15A signals are typically complex values, composed of both in phase and quadrature signals. The local oscillator 16 signal is generated from a sample clock 20 or a reference (not shown) common with the sample clock. All other timing is controlled by the sample clock 20. A real time controller 22 coordinates the operation of the waveform generators 10, 10A and local oscillator 16.

Figure 2:
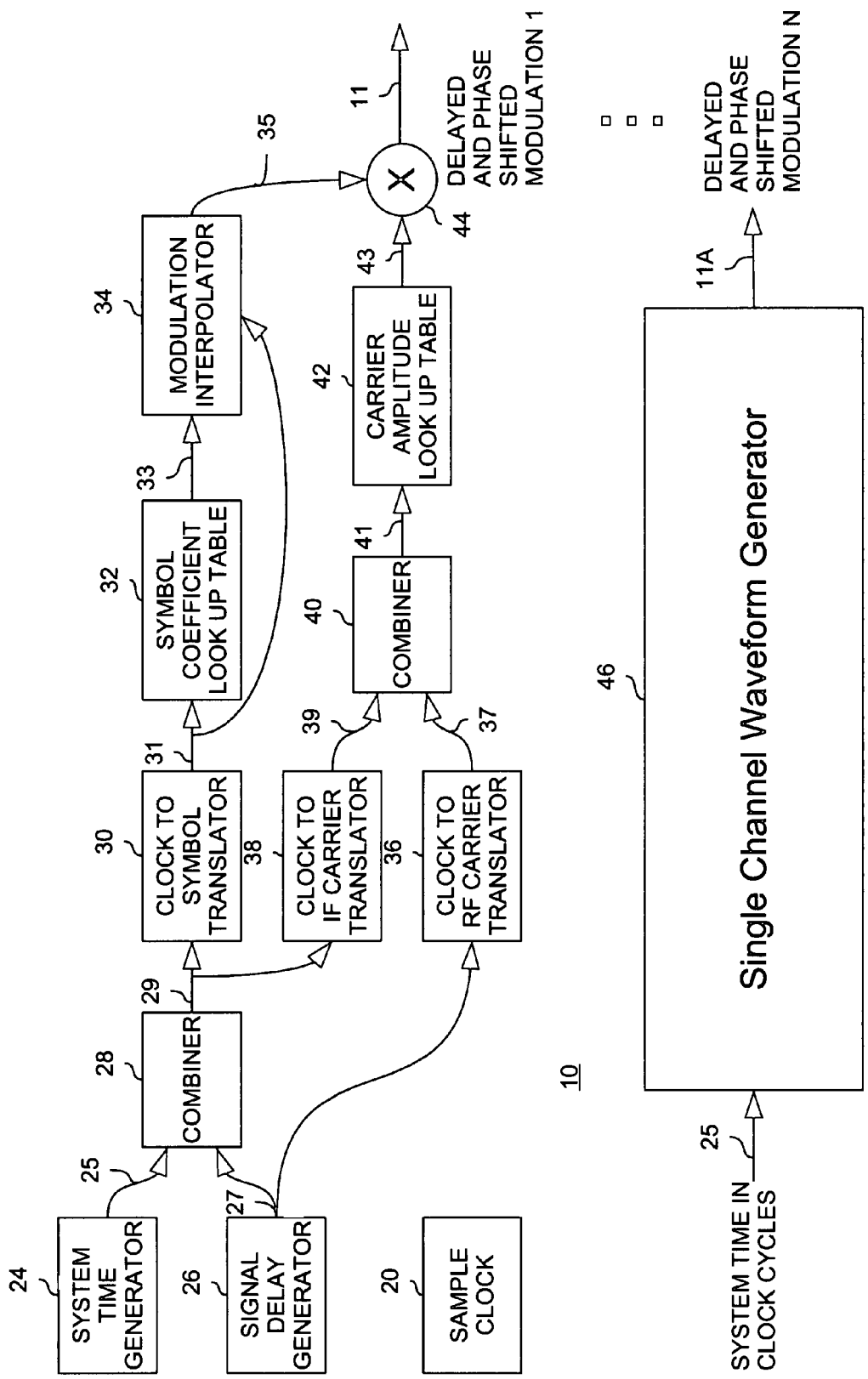
FIG. 2 is a block diagram showing the preferred embodiment of the multiple channel waveform generator.

The entire waveform generator 10 is implemented digitally. Multiple waveform generators 10, 10A may be implemented in a single semiconductor device. FIG. 2 shows the preferred embodiment of the multiple channel waveform generator 10. All register timing is controlled by the sample clock 20 common to all waveform generators 10, 10A.

The system time 25 and signal delay 27 in clock cycles are connected to a signal time combiner 28, and the resulting signal time 29 output goes to a translator 30 converting from units of clock cycles to symbols. The integer part of the signal time in symbols 31 is used as the address for a symbol coefficient look up table 32 or random access memory that contains the current symbol coefficient 33 for that point in time. After the old values are used, new values can be written to the symbol coefficient look up table 32 during operation by the real time controller 22 of FIG. 1. The current symbol coefficient 33 goes to a modulation interpolator 34 that calculates the effect of the fractional part of the signal time in symbols 31.

The signal delay in clock cycles 27 is connected to a translator 36 outputting the signal delay in carrier cycles 37. The signal time in clock cycles 29 may also go to a translator 38 converting from units of clock cycles to intermediate frequency (IF) carrier cycles. In this case, the delay in RF carrier cycles 37 is combined with the signal time in IF carrier cycles 39 to create the carrier phase 41. The carrier phase 41 is used as the address for a carrier amplitude look up table 42 or random access memory that contains the current carrier amplitude 43.

The interpolated modulation 35 and carrier amplitude 43 are connected to a multiplier 44, which outputs a single delayed and phase shifted modulation 11. This single channel waveform generator 46 functionality is duplicated for differently delayed versions 11A of the same signal. The system time is common and the look up tables have the same contents, but the signal delay generator 26 has a different value.

Figure 3A:
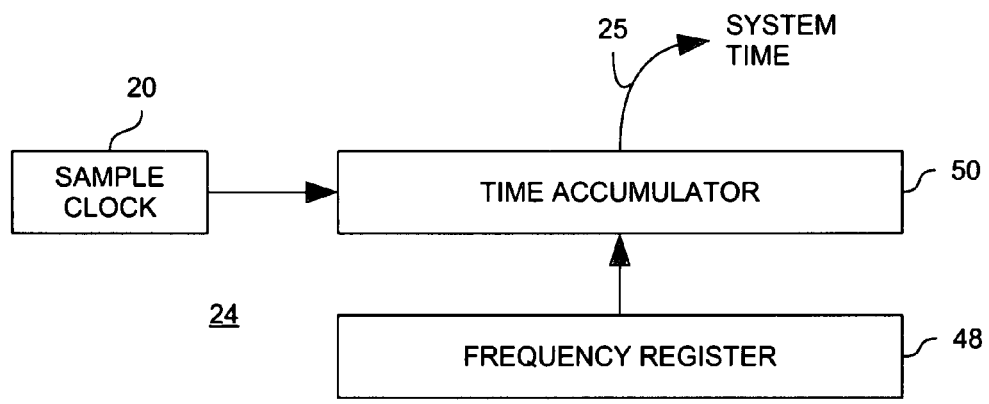
FIGS. 3A to 3B show block diagrams illustrating the derivative based generation of time and dynamic delay.

FIG. 3A shows the structure of the system time generator 24. The system time generator 24 consists of a frequency register 48, whose output is added to the current system time 25 in a time accumulator 50 each cycle of the sample clock 20. The time accumulator 50 provides the system time 25 output. New values can be written to the frequency register 48 and time accumulator 50 during operation by the real time controller 22 of FIG. 1. For the preferred embodiment, the frequency register 48 is typically fixed at one—so the system time is in units of clock cycles.

Figure 3B:
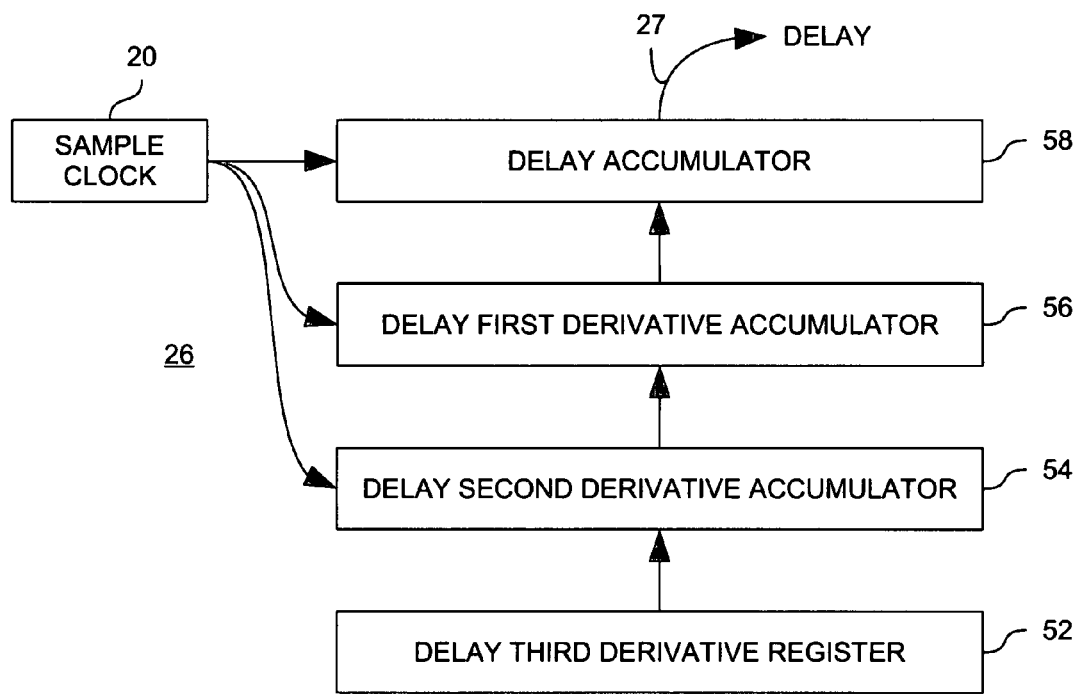

FIG. 3B shows the structure of the signal delay generator 26. The signal delay generator 26 has a derivative register 52 and a plurality of consecutive derivative accumulators 54 56 58 updated each cycle of the sample clock 20. The delay accumulator 58 provides the signal delay, 27 output. The contents of the register 52 and accumulators 54 56 58 can be overwritten during operation by the real time controller 22 of FIG. 1.

Figure 4:
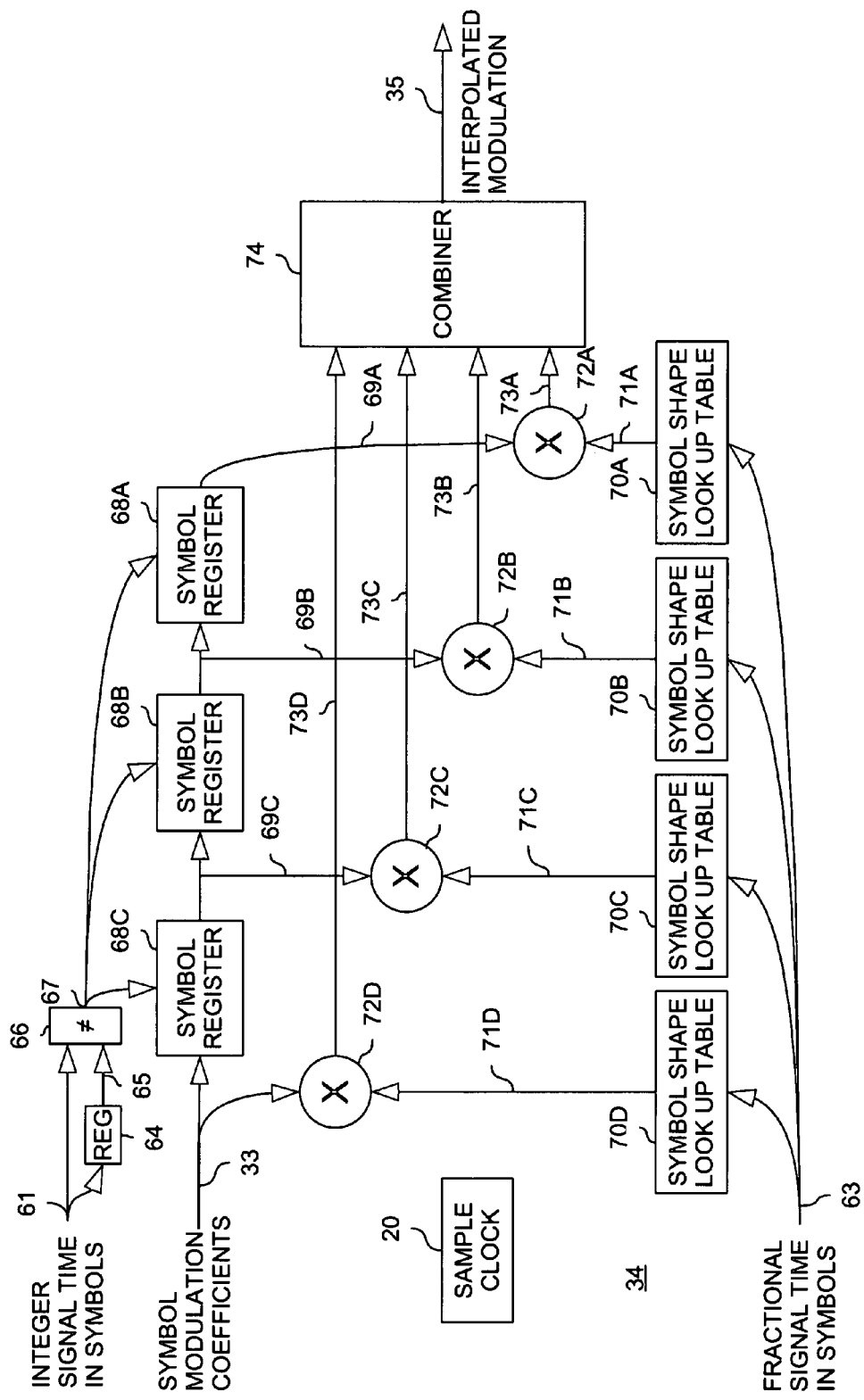
FIG. 4 is a block diagram showing the detailed implementation of the modulation interpolator.

FIG. 4 shows the detail of the modulation interpolator 34. The input signal time in symbols 31 from FIG. 2 is broken up into the integer part 61 and the fractional part 63. The integer part of the input signal time in symbols 61 is clocked through a time delay register 64 by the sample clock 20. The signal time 61 is compared 66 with the delayed signal time 65 to generate a clock enable 67. A plurality of symbol coefficient delay registers 68A 68B 68C are controlled by the clock enable 67, so they only update when new symbol coefficient 33 is present. The fractional part of the input signal time in symbols 63 is used as an address for a plurality of symbol shape look up tables 70A 70B 70C 70D or random access memory that contains the symbol shapes 71A 71B 71C 71D for those symbols at that point in time. The contents of the symbol shape look up tables 70A 70B 70C 70D may be overwritten during operation by the real time controller 22 of FIG. 1. The symbol shapes 71A 71B 71C 71D for the future and prior symbols are multiplied 72A 72B 72C 72D by the future and prior symbol coefficients 33 69A 69B 69C. The multiplier results 73A 73B 73C 73D are connected to a symbol combiner 74, and the combiner output is the interpolated modulation 35.

OPERATION

FIGS. 1, 2, 3, 4, 5, 6—Preferred Embodiment

The signal generator of FIG. 1 is designed to implement the equation for a generic modulated RF signal that has been delayed: $R(t)=\text{Real}\{M(t-D(t))*C(t-D(t))\}$. Here Real{ } represents a function taking only the real part of the argument. $M(x)$ is a complex function representing the modulation signal at time x. $D(x)$ is the dynamic time delay at time x. $C(x)=\exp(j*(w+v)*x)$ is the complex carrier modulation at time x, where j is the imaginary number, w is the angular RF frequency, and v is the angular IF carrier frequency.

FIG. 1 shows a plurality of N signal generators, one for each receiver antenna in the system under test. A waveform generator 10, 10A has common values for the symbol coefficient 32 of FIG. 2 and symbol shape 70A 70B 70C 70D of FIG. 4, but different signal delays 27. The key requirement for accurate testing is a precise control over the delay. There must be a correct phase and delay relationship between the different antennas, as well as between the carrier and modulation.

In the preferred embodiment, the carrier frequency is broken up into two parts that are multiplied together in the up converter 18, 18A $C(t-D(t))=\exp(j*w*t)*\exp(j*(v*(t-D(t))+w*(-D(t))))$. The undelayed RF carrier, $C_{rf}(t)=\exp(j*w*t)$, is implemented by the local oscillator 16 of FIG. 1. The IF carrier, $C_{if}(t-D(t))=\exp(j*v*(t-D(t)))$, and RF delay, $C_{rf}(-D(t))=\exp(jw*(-D(t)))$, are implemented in the waveform generators 10, 10A. The up converter 18, 18A is implemented by a radio frequency modulator. In an alternative embodiment, the up converter 18, 18A can be implemented by a voltage controlled oscillator. This would realize frequency modulation such that $R_{FM}(t)=\text{Real}\{\exp(j*(w+M(t-D(t)))*t)\}$.

A waveform generator 10, 10A implements the delayed and phase shifted modulation 11, 11A, 11B, 11C in discrete time, such that $G[i-D[i]]=M[i-D[i]]*C_{if}[i-D[i]]*C_{rf}[-D[i]]$. Here the function F[i] represents a scaled digital value of the analog signal F(x) at time x=i*Tc, where Tc is the duration of a sample clock 20 cycle. The digital signal is typically converted to analog by holding the voltage or current represented by F[i] from time $i*Tc \leq x < (i+1)*Tc$. The analog delayed modulated signal 15, 15A for a plurality of M sources is represented by the sum of the waveform generators 10, 10A: $A(t)=\Sigma_{k=1 \text{ to } M} G_k(t-D_k(t))$. Here $G_k$ represents the output of the kth waveform generator 10, 10A.

FIG. 2 shows how the preferred embodiment of the waveform generator 10 implements the modulation 35, IF carrier phase 39, and RF carrier phase shift 37. The system time 25 is common to all waveform generators 10, 10A, to ensure that there is no relative time error between sources. The signal delay generator 26 is common to the carrier and the modulation paths, to ensure that there is no accumulated relative delay error between them. The translators 30 36 38 are typically implemented by just a multiplier, but a modulo function will be required if the least significant bit of the frequency is not equal to the sampling rate divided by a power of 2. A modulo function will also be required on the output if the number of addresses is not a power of 2.

In an alternative embodiment, the system time 25 and signal delay 27 for modulation can be generated in units of symbols to avoid the need for a translator 30. This would simplify the hardware, but would require additional system time 25 and signal delay 27 generated in units of carrier cycles. The potential for accumulated precision errors on the carrier and modulation delays could cause problems for testing receivers having carrier aided modulation tracking loops. For this reason, the more accurate and complex embodiment is preferred.

The signal delay 27 as shown in FIG. 3B implements the dynamic delay model equation $D[i+x]=D[i]+x*D'[i]+(x-1)*x/2*D''[i]+(x-2)*(x-1)*x/6*D'''[i]$. Here the operator D' implies a derivative of the function D. This equation allows the waveform generator 10 to dynamically update the estimated delay without constant input from the real time controller 22 of FIG. 1. Any of the delay derivative values may be read or written at any time, but in the preferred embodiment the delay and delay first derivative are never updated. This ensures that there is no instantaneous jump in the phase or frequency to disrupt modulation and carrier tracking loops in the receiver. The second and third delay derivatives are updated every 0.1 seconds, allowing the real time controller 22 to periodically predict the signal delay and calculate values that correct the estimated delay and first derivative.

Figure 5:
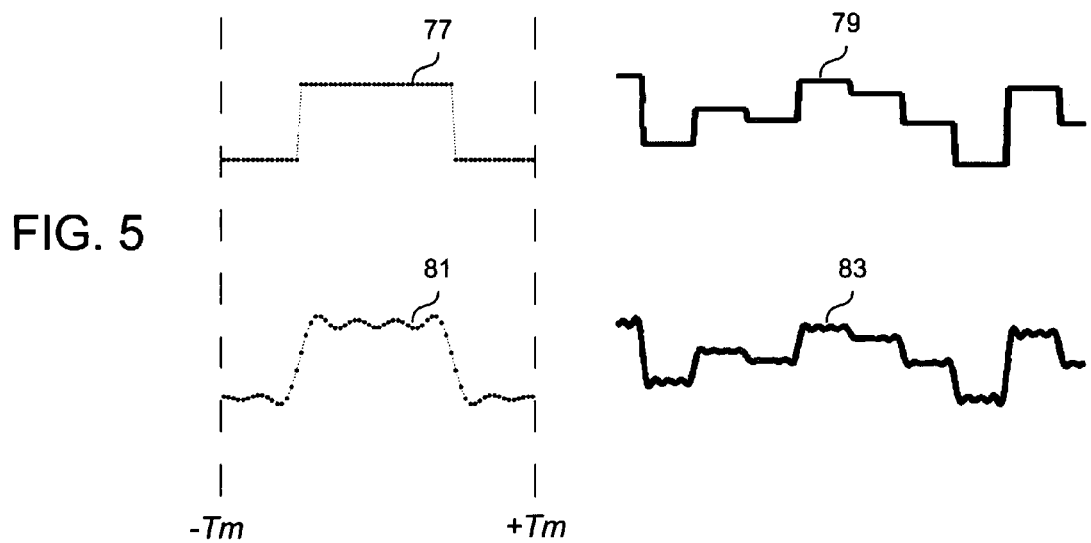
FIG. 5 illustrates examples of superresolution symbol shape waveforms for use in the modulation interpolator.

The ability to express delay information with a higher resolution than the duration of a sample clock 20 cycle relies on interpolation of the symbol modulation 34. To simplify this procedure, the preferred embodiment performs the interpolation in symbol time instead of sample time. The symbol modulation is broken up into two components that are multiplied together: the symbol coefficient that changes once every symbol period, and the symbol shape. FIG. 5 shows some examples of symbol shapes, where the duration is two symbol periods. The rectangular symbol shape 77 is multiplied by a random sequence of symbol coefficients to generate the rectangle interpolated modulation 79. The filtered rectangular shape 81 is used to generate the filtered rectangle interpolated modulation 83. These examples would require multiplying symbol coefficients by two symbol shapes, a duration of four symbol periods would require four symbol shapes, and a longer symbol duration would require combining more symbols.

Figure 6:
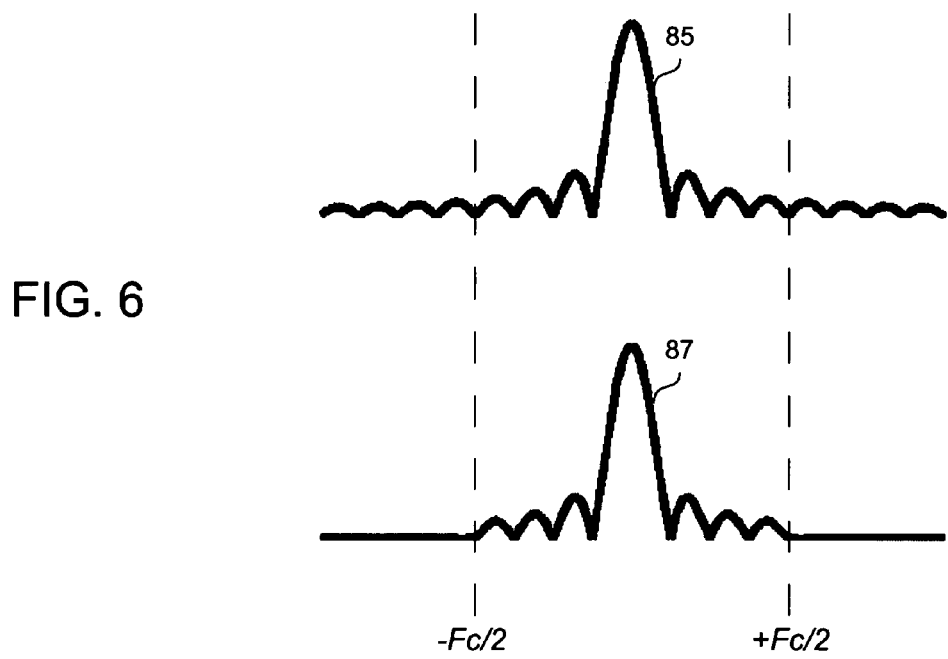
FIG. 6 shows the spectrum of symbol shapes, indicating power outside the sampling bandwidth.

The number of addresses in the symbol shape look up tables 70A 70B 70C 70D sets the best delay resolution the waveform generator 10 can implement. In FIG. 5 the resolution is 2 times the symbol period divided by the number of addresses. By making this precision, 2*Tm/number of addresses, less than the duration of a sample clock 20 cycle, Tc, we can achieve a resolution greater than the period of a sample. This superresolution comes with a cost, in that the potential frequency response of the symbol shape is greater than the frequencies that can be represented by the sample rate, $Fc=1/Tc$. FIG. 6 shows that the rectangular shape spectrum 85 will have signal power outside the frequencies that can be implemented with the given sampling rate. Power outside the sampling band from $-Fc/2$ to $Fc/2$ will be aliased back into the band. Once this has happened there is no way to remove the aliasing.

The filtered rectangular shape 81 of FIG. 5 shows a symbol shape that has had the higher frequencies removed. By filtering the symbol shape before it is saved in the look up tables 70A 70B 70C 70D, we can remove aliasing before it occurs. This requires no additional real time computation. The spectrum of the filtered rectangular shape 87 in FIG. 6 shows that the power outside the sampling band has been suppressed.

The output of the modulation interpolator 35 is a complex sequence of numbers representing the delayed modulation term, $M[i-D[i]]$, in the waveform generator output 11 of FIGS. 1 and 2. The output of the carrier amplitude look up table 43 is a complex sequence of numbers representing the carrier phase, $C_{if}[i-D[i]]*C_{rf}[-D[i]]$, in the waveform generator output 11. These numbers are combined in the digital multiplier 44 of FIG. 2 to get the desired waveform generator output, $G[i]=M[i-D[i]]*C_{if}[i-D[i]]*C_{rf}[-D[i]]$.

In the preferred embodiment, the whole functionality of a single waveform generator 46 is repeated to provide different delayed versions of the same signal. This is appropriate when the delay difference between the two signals is large. This may not be the most efficient embodiment when the relative difference in delay is small, such as a phased array application. Since everything is identical except values depending on the signal delay 27, it can be much more efficient to break up the signal delay 27 into absolute and relative terms. In this alternative embodiment, there can be a lot of functionality sharing between single waveform generators 46 to reduce the overall size of the design. The optimum combination depends on the precision of the signal delay 27, symbol rate, carrier frequencies, and the number of addresses in the modulation coefficient 32 and symbol shape 70A 70B 70C 70D look up tables.

The accuracy of the modulation interpolator 34 and carrier phase 41 in FIG. 2 allow an arbitrary delay to be implemented precisely. Not only does this reduce the amount of distortion in the delayed and phase shifted modulation 11, but it separates the symbol rate from dependence on the sample clock 20. The result is that it can generate multiple unrelated signals from different sources using a single sample clock 20. This allows multiple waveform generator outputs 11, 11A, 11B, 11C in FIG. 1 to be digitally combined 12, 12A without additional filtering, and the output sent to a single DAC 14, 14A.

CONCLUSION, RAMIFICATIONS, AND SCOPE

The reader will see that the waveform generator of this invention can be used to generate wide or narrow band RF signals for use in testing modern communications systems. By requiring only new symbol coefficients to implement modulation, the waveform generator is ideal for hardware in the loop testing where a real time controller must calculate platform motion or respond to signals from the unit under test. The reduction in aliasing and separation of symbol rate from the sample rate allows the generation of a plurality of signals per DAC. The generator design provides high precision arbitrary delays, without distorting the signals or adding aliasing. The high precision relative delays allow testing of multiple input multiple output, beamforming, anti-jam, direction finding, diversity, and other systems that have multiple transmitter or receiver antennas that are close or far apart.

While the above description contains many specificities, these should not be construed as limitations on the scope of the invention, but as exemplifications of the presently preferred embodiments thereof. Many other ramifications and variations are possible within the teachings of the invention. For example, the waveform generator could be implemented in a field programmable gate array (FPGA), application specific integrated circuit (ASIC), or in software. The entire test system including the signal generator and the system under test could also be implemented in software. The waveform generator output could be directly output to a DAC, or saved for later use with a conventional waveform generator. The interpolated modulation output can be used as is, added to the carrier amplitude look up table input to implement phase modulation, or input to an amplitude controlled oscillator to implement frequency modulation. The modulation coefficient and symbol shape look up tables could be implemented as random access memory or first in first out queues. The look up tables can be in the FPGA/ASIC, or in discrete external

I claim:

1. A waveform generator, comprising:
   a. a means for generating a signal time in symbol periods,
   b. a symbol coefficient look up table that outputs a current symbol coefficient determined from an integer part of said signal time in symbol periods,
   c. a plurality of symbol shape look up tables that output current symbol shapes of prior and future symbols determined from the fractional part of said symbol time in symbol periods, where there are more addresses in said symbol shape look up tables than there are samples per symbol period,
   d. a plurality of consecutive symbol coefficient delay registers outputting a plurality of future and prior symbol coefficients, where each one delays said current symbol coefficient by one additional symbol period,
   e. a plurality of multipliers that generate a plurality of future and prior symbol values from multiplying said future and prior symbol coefficients by said future and prior symbol shapes,
   f. a symbol combiner that sums said future and prior symbol values to generate interpolated modulation,
   whereby said interpolated modulation will include scaling changes when said signal time in symbol periods is not an integer.

2. The waveform generator of claim 1, wherein said means for generating a signal time in symbol periods comprises:
   a. a system time generator for calculating a system time,
   b. a signal delay generator for calculating a signal delay,
   c. a means for generating the signal time in symbol periods from said system time and said signal delay,
   whereby a different signal delay can be used in a plurality of said waveform generators to generate said interpolated modulation with accurate relative delays.

3. The waveform generator of claim 2, further including a plurality of waveform generators having the same values for said symbol coefficient look up table and said symbol shape look up table, but different values for said signal delay whereby a plurality of differently delayed versions of said interpolated modulation are generated with accurate relative delays.

4. The waveform generator of claim 2, further including:
   a. a means for generating a signal delay in radio frequency carrier cycles of an external local oscillator from said signal delay,
   b. a carrier amplitude look up table that outputs a current carrier amplitude determined from the fractional part of said signal delay in radio frequency carrier cycles,
   c. a multiplier that generates a delayed and phase shifted modulation from multiplying said current carrier amplitude by said interpolated modulation,
   whereby said signal delay of said local oscillator is accurately modeled.

5. The waveform generator of claim 2, further including:
   a. a means for generating a signal delay in radio frequency carrier cycles of an external local oscillator from said signal delay,
   b. a means for generating a signal time in intermediate frequency carrier cycles from said signal time,
   c. a signal time combiner for summing said signal delay in radio frequency carrier cycles and said signal time in intermediate frequency carrier cycles to generate a carrier phase,
   d. a carrier amplitude look up table that outputs a current carrier amplitude determined from the fractional part of said carrier phase,
   e. a multiplier that generates a delayed and phase shifted modulation from multiplying said current carrier amplitude by said interpolated modulation,
   whereby an intermediate frequency is implemented in said delayed and phase shifted modulation for ease of use with an analog to digital converter.

6. The waveform generator of claim 2 wherein said signal delay is generated by adding a signal velocity to said signal delay every sample clock, and adding a signal acceleration to said signal velocity every sample clock.

7. The waveform generator of claim 1, further including:
   a. a means for generating a signal time in intermediate frequency carrier cycles from said signal time,
   b. a carrier amplitude look up table that outputs a current carrier amplitude determined from the fractional part of said signal time in intermediate frequency carrier cycles,
   c. a multiplier that generates a delayed and phase shifted modulation from multiplying said current carrier amplitude by said interpolated modulation,
   whereby an intermediate frequency is implemented in said delayed and phase shifted modulation for ease of use with an analog to digital converter.

8. The waveform generator of claim 1, further including a digital to analog converter that uses said interpolated modulation to generate an analog delayed modulation.

9. The waveform generator of claim 8, further including a radio frequency modulator that up converts said analog delayed modulation to a delayed modulated radio frequency signal.

10. The waveform generator of claim 8, further including a voltage controlled oscillator that up converts said analog delayed modulation to a frequency modulation.

11. The waveform generator of claim 1, further including a carrier amplitude look up table that outputs a current carrier amplitude determined from the interpolated modulation, whereby said current carrier amplitude represents said interpolated modulation converted to interpolated phase modulation.

12. The waveform generator of claim 1, further including:
   a. a multiplier that generates a signal time in intermediate frequency carrier cycles from multiplying said signal time by said interpolated modulation,
   b. a carrier amplitude look up table that outputs a current carrier amplitude determined from a fractional part of said signal time in intermediate frequency carrier cycles, whereby said current carrier amplitude represents said interpolated modulation converted to interpolated frequency modulation.

13. The waveform generator of claim 1 wherein contents of said symbol shape look up tables are prefiltered whereby the power of said symbol shape outside a sampling band is removed instead of aliasing into the sampling band.

14. The waveform generator of claim 1, further including a plurality of independent waveform generators, and a modulation combiner that sums all said interpolated modulation from said waveform generators to generate a combined modulation.

15. A method for generating an arbitrary waveform, comprising:
  a. generating a signal time in symbol periods,
  b. providing a symbol coefficient look up table that outputs a current symbol coefficient determined from an integer part of said signal time in symbol periods,
  c. providing a plurality of symbol shape look up tables that output current symbol shapes of prior and future symbols determined from a fractional part of said symbol time in symbol periods, where there are more addresses in said symbol shape look up tables than there are samples per symbol period,
  d. providing a plurality of consecutive symbol coefficient delay registers outputting a plurality of future and prior symbol coefficients, where each one delays said current symbol coefficient by one additional symbol period,
  e. multiplying said future and prior symbol coefficients by said future and prior symbol shapes to generate a plurality of future and prior symbol values,
  f. summing said future and prior symbol values to generate interpolated modulation, whereby said interpolated modulation will include scaling changes when said signal time in symbol periods is not an integer.

16. The method of claim 15, wherein generating said signal time in symbol periods comprises subtracting a signal delay from a system time, whereby a different signal delay can be used in a plurality of waveform generators to generate said interpolated modulation with accurate relative delays.

17. The method of claim 16 wherein generating said signal delay comprises adding a signal velocity to said signal delay every sample clock, and adding a signal acceleration to said signal velocity every sample clock.

18. The method of claim 16, further including:
  a. generating a signal delay in radio frequency carrier cycles of an external local oscillator from said signal delay,
  b. providing a carrier amplitude look up table that outputs a current carrier amplitude determined from a fractional part of said signal delay in radio frequency carrier cycles,
  c. multiplying said current carrier amplitude by said interpolated modulation to generate a delayed and phase shifted modulation,
  whereby said signal delay of said local oscillator is accurately modeled.

19. The method of claim 15, further including:
  a. generating a signal time in intermediate frequency carrier cycles,
  b. providing a carrier amplitude look up table that outputs a current carrier amplitude determined from a fractional part of said signal time in intermediate frequency carrier cycles,
  c. multiplying said current carrier amplitude by said interpolated modulation to generate a delayed and phase shifted modulation,
  whereby an intermediate frequency is implemented in said delayed and phase shifted modulation for ease of use with an analog to digital converter.

20. The method of claim 15 wherein said symbol shape look up table contents are prefiltered whereby the power of said symbol shape outside a sampling band is removed instead of aliasing into the sampling band.

* * * * *